United States Patent [19]
Becker et al.

[11] Patent Number: 5,235,684
[45] Date of Patent: Aug. 10, 1993

[54] SYSTEM BUS HAVING MULTIPLEXED COMMAND/ID AND DATA

[75] Inventors: Robert D. Becker, Shirley; Martin J. Schwartz, Worcester; Kevin H. Curcuru, Pepperell, all of Mass.

[73] Assignee: Wang Laboratories, Inc., Lowell, Mass.

[21] Appl. No.: 213,402

[22] Filed: Jun. 30, 1988

[51] Int. Cl.[5] .......................................... G06F 13/42
[52] U.S. Cl. ............................ 395/325; 364/DIG. 2; 364/940.2; 364/942.1; 364/210.1; 364/271.6
[58] Field of Search ............... 364/200 MS, 900 MS; 395/325

[56] References Cited

U.S. PATENT DOCUMENTS

| | | | |
|---|---|---|---|
| 4,232,366 | 11/1980 | Levy et al. | 364/200 |
| 4,263,648 | 4/1981 | Stafford et al. | 364/200 |
| 4,285,037 | 8/1981 | Von Stetten | 364/200 |
| 4,458,309 | 7/1984 | Wilder, Jr. | 364/200 |
| 4,541,045 | 9/1985 | Kromer, III | 364/200 |
| 4,631,667 | 12/1986 | Zulian et al. | 364/200 |
| 4,763,249 | 8/1988 | Bomba et al. | 364/200 |

Primary Examiner—Rebecca L. Rudolph
Attorney, Agent, or Firm—David N. Caracappa; Kenneth L. Milik

[57] ABSTRACT

A system bus 12 for an information processing system 10 includes a first group of signal lines 16 whereon command/ID information is time multiplexed with data, and a second group of signal lines 14 for conveying address information. During a first bus cycle command/ID information is presented on the first group of signal lines while the address is presented on the second group of signal lines. During a subsequent bus cycle, and for a data write or data return operation, the first group of signal lines conveys data. Other bus connections, such as cache memories, are thus apprised of the address a full bus cycle before the data is presented thereby providing the bus connections with sufficient time to decode and otherwise operate on the bus information. Multiple word data returns from a system memory are characterized as having the address associated with a particular word of data presented in the immediately prior bus cycle, facilitating the pipelining of data and address information through the system bus. The dual functionality of the first group of signal lines eliminates the requirement for separate and dedicated command/ID and data signal line paths and associated driving and receiving circuit elements.

17 Claims, 3 Drawing Sheets

| 00 03 | 04       11 | 12       15 | 16            31 |
|-------|-------------|-------------|------------------|
| RESVD | TARGET 8    | MESSAGE TYPE 4 | 2-BYTE MESSAGE 16 |

FIG. 3a

| 0   3 | 4       11 | 12       15 | 16            31 |
|-------|------------|-------------|------------------|
| RESVD | CPU ID 8   | COMMAND 4   | 2-BYTE MESSAGE 16 |

FIG. 3b

| 0   3 | 4       11 | 12       15 | 16      19 | 20       31 |
|-------|------------|-------------|------------|-------------|
| RESVD | SBI ID 8   | COMMAND 4   | IOC ID 4   | SPARE 12    |

FIG. 3c

| 0   3 | 4       11 | 12       15 | 16            31 |
|-------|------------|-------------|------------------|
| RESVD | CPU ID 8   | COMMAND 4   | 2-BYTE MESSAGE 16 |

FIG. 3d

| 0   3 | 4       11 | 12       15 | 16      19 | 20       31 |
|-------|------------|-------------|------------|-------------|
| RESVD | SBI ID 8   | COMMAND 4   | IOC ID 4   | SPARE 12    |

FIG. 3e

SYSTEM BUS HAVING MULTIPLEXED COMMAND/ID AND DATA

FIELD OF THE INVENTION

This invention relates generally to an information processing system and, in particular, to a high speed, non-interlocked system bus for coupling together elements of the system.

BACKGROUND OF THE INVENTION

Non-interlocked system buses are characterized as having a data request cycle and a data return cycle which may be temporally separated. That is, an element which is connected to the system bus, or bus connection, may request access to data stored in another bus connection, for example, a system memory. This request cycle defines one bus transaction. Thereafter, the data is returned to the requester during another bus transaction. During the interval of time between the request and return transactions other bus connections may also make requests of the memory; these subsequent requests being queued by a memory controller and executed in sequence.

In order to identify the requester and the type of access required it is known to provide a group of signal lines on the system bus which define a unique identification (ID) associated with the requester and also the particular type of access, or command. In addition, another group of signal lines convey an address which identifies the source or sink location of the data while another group of signal lines is dedicated to the bidirectional transfer of the data itself.

As can be appreciated, the provision of discrete signal lines to convey the ID and command information necessitates the provision of associated signal paths and circuit elements connected to the signal paths. Such signal paths and circuit elements occupy some finite amount of volume and consume system power. In modern computer systems a desirable goal is the reduction of overall volume and power consumption and the dedication of available volume and power to highly integrated, and hence highly functional, components.

Furthermore, for those systems which employ one or more high speed cache memories tightly coupled to associated CPUs address information flowing over the system bus is typically monitored to determine if the associated data is contained within the cache memory and, if so, whether the cache is required to interrupt or otherwise intercede in a bus transaction in order to ensure that data accessed reflects the current state of that data.

During a write type of bus access, wherein the address and data information are simultaneously provided on the bus, it can be appreciated that the cache must very quickly decode and compare the address to those addresses presently stored within the cache in order to determine whether bus intervention is required. Inasmuch as a typical bus transaction may occur in a duration of time measured in some hundreds of nanoseconds, the necessary speed requirements of the cache are substantial.

SUMMARY OF THE INVENTION

The foregoing problems are overcome and other advantages are realized, in accordance with methods and apparatus of the invention, by a system bus for an information processing system which includes a first group of signal lines whereon command/ID information is time multiplexed with data, and a second group of signal lines for conveying address information. During a first system bus cycle command/ID information is presented on the first group of signal lines while the address is presented on the second group of signal lines. During a subsequent bus cycle, and for a data write or data return operation, the first group of signal lines conveys data. Other bus connections, such as cache memories, are thus apprised of the address a full bus cycle before the data is presented thereby providing the bus connections with ample time to decode and otherwise operate on the bus information. Multiple word data returns from a system memory are characterized as having the address associated with a particular word of data presented in the immediately prior bus cycle, facilitating the pipelining of data and address information through the system bus. The dual functionality of the first group of signal lines eliminates the requirement for separate and dedicated command/ID and data signal line paths and associated driving and receiving circuit elements, thereby achieving a reduction in required volume and power consumption.

Further in accordance with the method and apparatus of the invention there is disclosed an information processing system comprising a system bus and a plurality of bus connections coupled to the system bus, at least one of the bus connections comprising memory means for storing information units at storage locations defined by addresses. At least one of the bus connections is operable for generating an address for reading information units from or for storing information units within a storage location defined by the generated address. The information processing system includes a system clock, the system clock having a period which defines a bus cycle. The system bus includes a plurality of dual function signal lines for expressing, during a first bus cycle, an information unit expressive of an identification of a bus connection and an information unit expressive of a type of access to be made to a memory by the identified bus connection; the dual function signal lines further being expressive of, during a second bus cycle, an information unit read from a storage location or an information unit to be stored within a storage location. The system bus further includes a plurality of address signal lines for expressing, during the first bus cycle, an address within the memory means associated with the storage location from which an information unit is to be read or within which an information unit is to be stored. The system bus also includes at least one signal line the state of which is expressive of whether the dual function signal lines are expressive of an information unit associated with the first bus cycle or an information unit associated with a subsequent bus cycle.

BRIEF DESCRIPTION OF THE DRAWINGS

The foregoing aspects of the invention will be made more apparent in the following detailed description of a preferred embodiment read in conjunction with the accompany drawing wherein:

FIGS. 3a-3e show various data fields used in the transmission of Interprocessor Communication (IPC) commands.

DETAILED DESCRIPTION OF A PREFERRED EMBODIMENT

Figure 1:
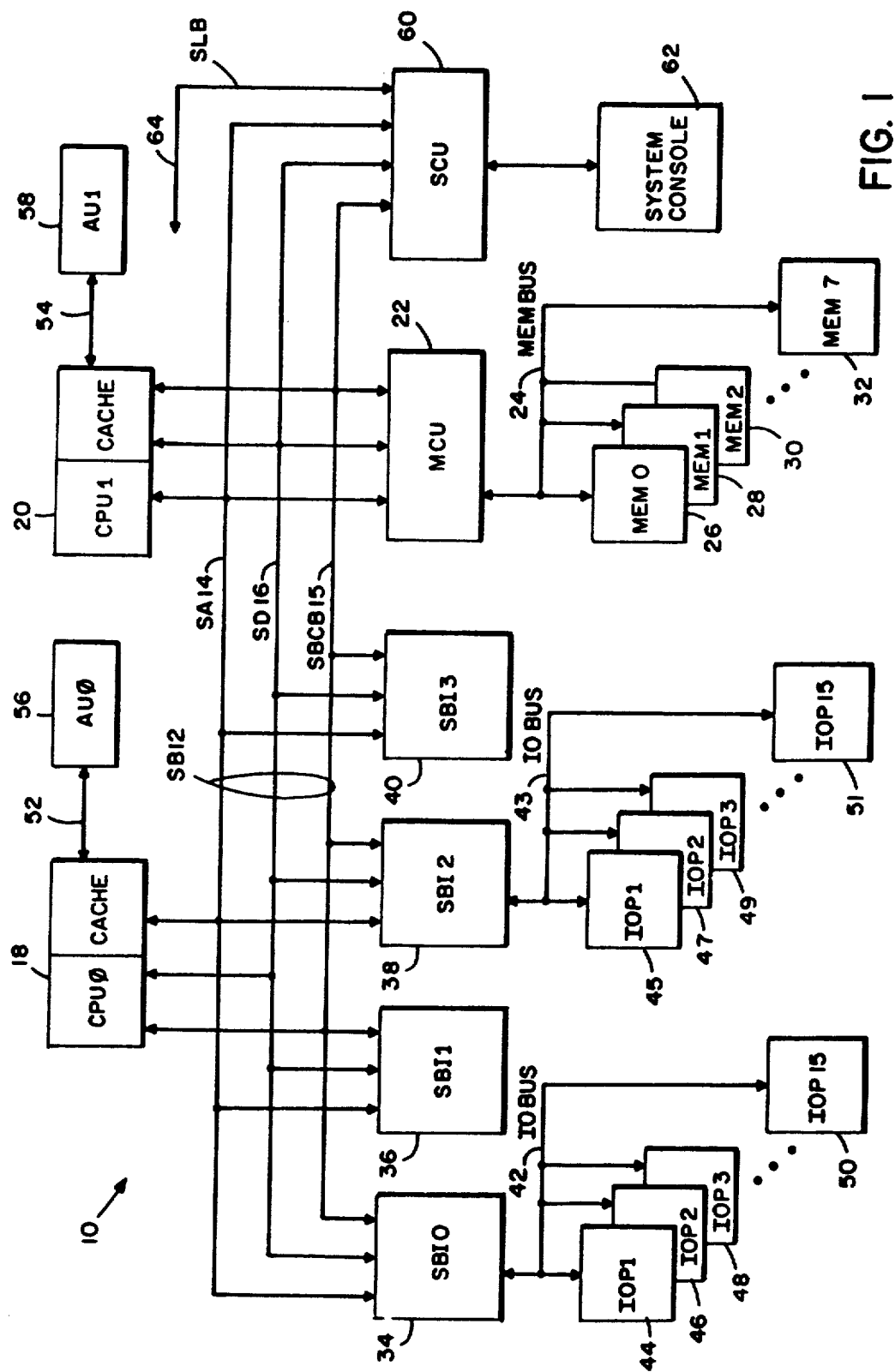
FIG. 1 is a block diagram of an information processing system incorporating the present invention.

Referring to FIG. 1 there is shown an information processing system (SYSTEM) 10 incorporating a preferred embodiment of the invention. As seen, SYSTEM 10 comprises a System Bus (SB) 12 which further comprises a System Address Bus (SA) 14, a System Bus Control Bus (SBCB 15) and a System Data (SD) bus 16. SB 12 functions to convey information units between the various components of the SYSTEM 10. Information units may be addresses, I/O input or output data, operands, instructions or any other type of information which passes between the components of the SYSTEM 10. In the preferred embodiment of the invention SB 12 is a high speed, non-interlocked bus which operates at ECL voltage levels. Typically, logic signals on the bus swing between approximately $-0.9$ volts and $-1.8$ volts.

Coupled to System Bus 12 are a plurality of system units, or bus connections, which include a first central processing unit (CPU0) 18 and an optional second CPU1 20. Also coupled to SB 12 is a memory control unit (MCU) 22 which has coupled thereto via a memory bus 24 one or more memory boards, such as MEM0 26, MEM1 28 and MEM2 30. In the preferred embodiment of the invention MCU 22 may be coupled to up to eight memory boards, such as the MEM7 32. Each memory board may store from, for example, four million bytes (4 MB) to 128 MB of information depending upon the type and quantity of memory devices installed. SB 12 also has coupled thereto one or more system bus interface (SBI) units, such as the SBI0-SBI3, 34, 36, 38 and 40, respectively. Each of the SBIs is further coupled to an associated I/O data bus (IODB), such as the IODBs 42 and 43 coupled to SBI0 34 and SBI1 36, respectively. Each IODB in turn has coupled thereto up to fifteen intelligent I/O processors (IOPs), such as the IOPs 44-50 and IOPs 45-51. In the preferred embodiment of the invention the IODBs 42 and 43 operate at TTL levels. That is, logic signals on these buses swing between approximately zero volts and $+5.0$ volts.

CPU0 18 and CPU1 20 each comprise a associated high speed cache memory and are each further coupled via a cache data bus (CDB) 52 and 54, respectively, to an arithmetic unit (AU0) 56 and AU1 58, respectively.

Also coupled to SB 12 is a support control unit (SCU) 60 having a system console (SC) 62 coupled thereto. A support link bus (SLB) 64 provides access and communications from the SC 62, via SCU 60, to the various bus connections coupled to the SB 12. Diagnostic and other information, such as system initialization data, is generally provided over SLB 64. Each bus connection, such as SBI0 34, comprises a support control unit interface (SCUI) device (not shown) which is coupled to SLB 64 and which is adapted to receive and transmit data over SLB 64. In a preferred embodiment of the invention SLB 64 comprises a bidirectional data line and a control line. Information on the control line indicates the source/destination of a particular SLB 64 data transaction. During the following 16 clock cycles data is transmitted in the indicated direction over the bidirectional data line. The system console 62 may be a computer or any device suitable for transmitting data to and receiving data from the SYSTEM 10.

In general, the CPUs 18 or 20 generate virtual memory addresses which are translated into physical addresses and issued over SA bus 14. Addresses are received and interpreted by MCU 22 for addressing, via the memory bus 24, instructions and data which are stored in the memory boards 26-32. Furthermore, SBIs, 34-40 are also operable for transferring memory addresses and data over the system bus 12 for storing within and retrieving data from the memory boards 26-32. It should be realized that one or more of the IOPs 44-51 may be coupled to up to four mass storage devices such as a magnetic disk. Also, some of the IOPs may be coupled to data communications means operable for inputting and outputting data from the system 10. The IOPs may also be coupled to operator workstations where an operator enters data into the system.

In order to facilitate the description of the invention the operation of the SB 12 will now be described in further detail.

SB 12 is a synchronous, non-interlocked bus having a 64 bit data path and a 28 bit address path. SB 12 provides a peak interconnect bandwidth of 200 Mb/sec. and is, as previously mentioned, comprised of emitter coupled logic (ECL) drivers and receivers.

The following signals describe the System Bus 12 operation and protocol.

System Data (SDATA(0:63))

System Data Bus 16. All memory data traffic to and from bus connections is transferred via these 64 lines. In accordance with the invention when the CMD Flag, to be described, is asserted then certain of these lines are used to transmit Command-ID information, as described below in relation to CMD and ID.

Data Parity (SDPAR(0:7))

Odd Data Parity. One parity bit for each data byte, eight total, of SDATA 16.

System Address (SA(04:31))

System Address Bus. A bus connection transmits during a memory read or write cycle a memory address to the MCU 22 via these 28 lines. The MCU 28 thereafter drives these lines with the address of data read one bus cycle before the data is driven on the bus. Writeback caches coupled to the SB 12 use the MCU 22 driven address to make directory comparisons to determine if bus intervention is required and also drive the address lines during a cache re-transmission. Also, the system address lines, during an IPC transaction (to be described), convey the IPC message and other IPC related data.

Address Parity (SAPAR)

Odd Address Parity bit.

Command Flag (CMDF)

This line, when asserted by a bus connection, indicates that the SDATA Bus 16 is being used by the bus connection to transmit Command-ID information. When this line is not asserted and the bus is valid as indicated by BUSVLD, described below, CMDF indicates that SDATA 16 is transmitting data.

Command (CMD)

During a bus cycle when CMDF is asserted a bus connection places the type of command on SDATA [48:55] to initiate a memory operation or, in the case of the MCU 22, to return data to a requesting bus connection. The eight bit CMD field encodes the type of bus operation.

In the preferred embodiment of the invention the various types of bus operations encoded by the CMD field are as follows.

OPERATION

No Operation
Read Double Word
Read Quad Word
Read Octal Word
Write Byte
Write Word
Write Double Word
Data Return (transmission from MCU)
Transmit IPC
Read MCU
Write MCU Other signals which comprise the SB 12 are as follows.

ID

Each bus connection has a unique identifier (ID). During a bus cycle when a bus connection asserts CMDF the bus connection drives its unique ID onto SDATA [56:63] along with the bus command (CMD) on SDATA [48:55]. The MCU 22 drives the previously received and buffered ID of a bus connection which made a memory request when the data is returned to the requesting bus connection. During the assertion of a Transmit IPC command on SDATA[48:55] a bus connection drives the ID of the target of the IPC command on SDATA[56:63].

Busy (BSY)

This signal line is asserted by a bus connection during all cycles of a bus operation except the last cycle. BSY is sampled at the end of each bus cycle by all connections wishing to use the bus and indicates, when asserted, that the bus is in use and is unavailable to other bus connections. During a START IO IPC command directed to an IOP through an associated SBI the SBI continues to drive the BUSY line until communication is established with the target IOP and a determination is made as to whether the IOP has accepted the START IO command.

Bus Valid (BUSVLD)

This signal is asserted by a bus connection when valid information is placed on the bus.

Lock (LOCK)

Asserted by a bus connection when it is desired to prevent other bus connections (except the MCU 22) from using the bus. This signal line is utilized to implement semaphore instructions that perform read-modify-write operations.

CPU Hold (CPUHLD)

Two CPUHLD signals are provided, one for each CPU. This signal is generated by a CPU and is sampled at the end of each bus cycle by all other bus connections. This signal indicates that one of the write-back caches may be either retransmitting MCU 22 data or may be updating stored information. CPUHLD has the same effect as BSY; it indicates that the bus is still in use and unavailable to all other bus connections. Like BSY, CPUHLD is deasserted one cycle before the last bus cycle. It is also used by a CPU to interlock fetch/writeback operations for the cache.

MCU Hold (MCUHLD)

Generated by the MCU and sampled at the end of each bus cycle by all other bus connections. This signal indicates that the MCU has detected a correctable error and will be retransmitting the data in corrected form. The system bus protocol for MCUHLD is similar to that of CPUHLD.

Write Acknowledge (WACK)

Acknowledge generated by the MCU 22 in response to Write operations in the bus cycle following the data cycle and by target devices in response to Interprocessor Communication (IPC) operations.

Target Busy (TB)

This signal is generated by a target device in response to an IPC transmission. TB being asserted indicates that the target is busy and that the transmission was not accepted.

Bus Error (BUSER)

Asserted by any bus connection detecting a bus error.

Mem Exception (MEMX)

Asserted by the MCU during the cycle following address transmission if an Invalid Memory Address is received or during the cycle following data transmission if a double bit, uncorrectable, memory error occurs during a memory read.

Xmit Rq In/Xmit Rc Out (XRQI/XRQO)

This signal is daisy chained between bus connections. A bus connection wishing to use the bus will assert Xmit Rq Out and start transmitting on the next cycle only if the following conditions are met:
Xmit Rq In from its higher neighbor is false;
Busy is False;
Hold is False; and
LOCK is False (Only if not an MCU).

A bus connection passes Xmit Rq In from its higher priority neighbor to Xmit Rq Out which is connected to its lower priority neighbor.

Figure 2A:
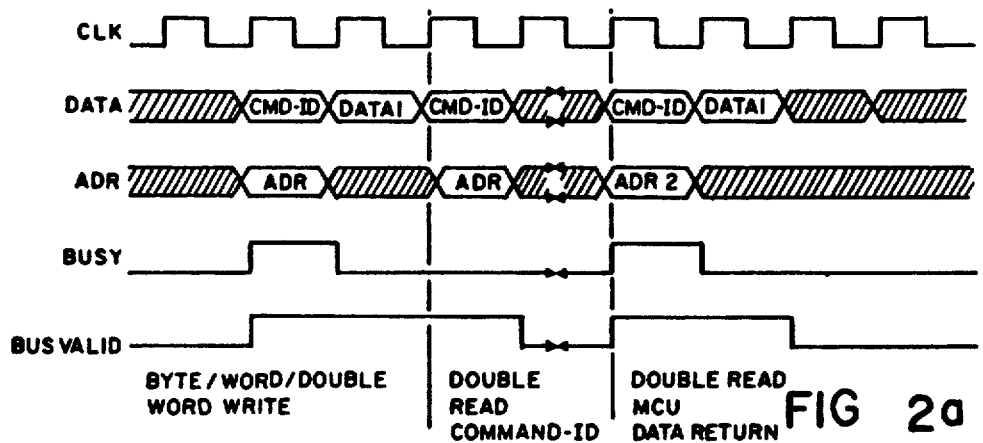
FIGS. 2a-2c illustrate the operation of the non-interlocked system bus of the invention.
Figure 2B:
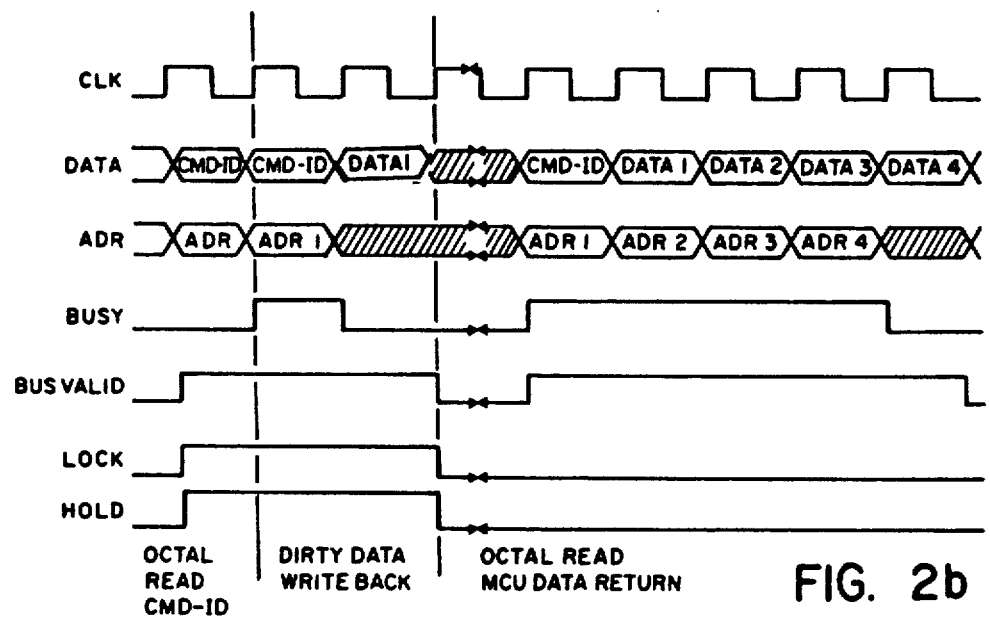
Figure 2C:
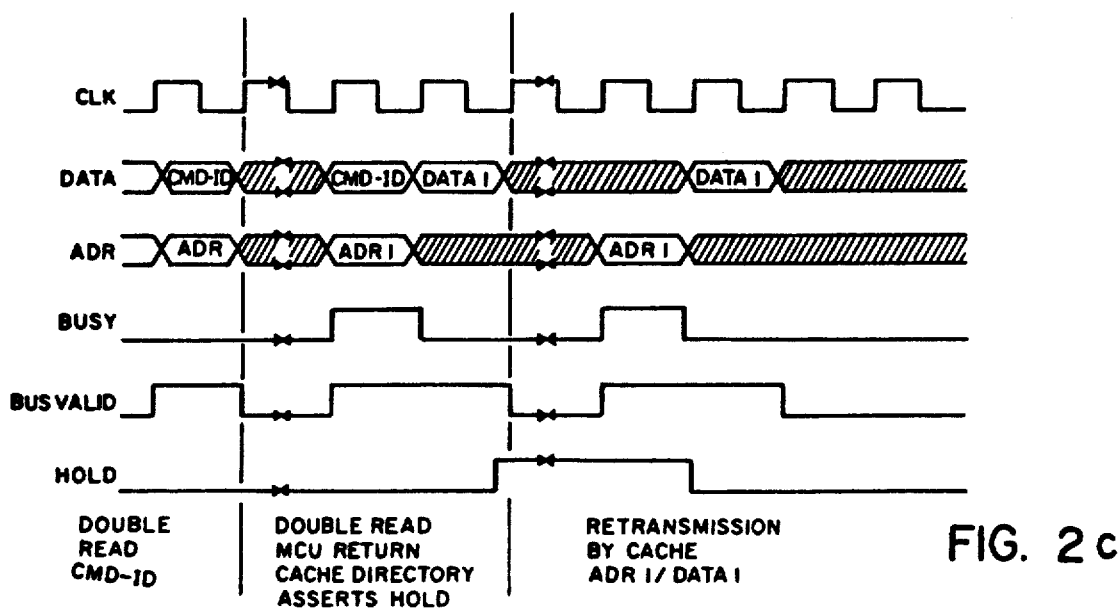

The timing diagrams of FIG. 2 illustrate various types of bus transactions including, in accordance with the invention, the operation of the multiplexed Command/ID and data path having an associated address which is presented during a bus cycle which precedes the presentation of data on SDATA 16. In the timing diagrams of FIGS. 2a-2c signal timing is referenced to the period of the system clock (CLK) signal, the clock period representing approximately one bus cycle. In a preferred embodiment of the invention the basic timing unit or time interval, that is the period of CLK, is approximately 40 nanoseconds. It should be realized however that the teaching of the invention applies to periods other than this presently preferred basic timing unit.

FIG. 2a shows a byte/half/word/double write immediately followed by the Command-ID portion of a double word (64 bit) read followed by an MCU data return of the requested double word.

FIG. 2b demonstrates the use of CPUHLD for a cache fetch/writeback. A CPU is shown sending Command-ID information to the MCU 22 for an octal word read and thereafter a double word cache write-back. The MCU 22 responds with the return of four double words. CPUHLD prevents another bus connection from using the bus during this sequence.

FIG. 2c further demonstrates the use of the CPUHLD line. A bus connection is shown requesting a double word read and the MCU 22 returning the requested double word. The cache or caches latch the address of the double word, and do directory look-ups in the following cycle. If a "dirty" match is found by a cache, that cache asserts CPUHLD shortly before the end of the cycle. The CPUHLD line prevents other connections from using the bus until the write-back cache re-transmits the double word along with its address and thereafter releases CPUHLD. BSY is asserted during the first cycle of retransmission and BUSVLD is asserted for two cycles if retransmission is performed.

As can be seen, for those bus transactions illustrated in FIG. 2 wherein data is written by a bus connection to the system memory the CMD/ID information and the destination address are presented in the same bus cycle followed by the presentation of the data to be written on the subsequent bus cycle. Also, data returned from memory by the MCU 22 is associated with the address from which the data was retrieved; the associated address being returned during the bus cycle which precedes the data. Furthermore, it can be seen that the SDATA 16 lines are advantageously multiplexed between the CMD/ID and the data information, thereby realizing a reduction in required signal lines, a reduction in signal line driver and receiver devices and a consequent reduction in power consumption.

The Interprocessor Communication (IPC) facility allows bus connections to directly communicate with one other by sending IPC messages. The bus protocol for sending these messages resembles a Write operation except that the Transmit IPC command is used instead of a Write command. The SA 12 that is transmitted along with the Command/ID lines has the format indicated in FIG. 3a. Depending on the state of eight Target Field bits the following targets are specified, it being remembered that the target ID is expressed by the ID field of SDATA[56:63].

TARGET

SCU
CPU0
CPU1
SBI0
SBI1
SBI2
SBI3

The 64 bit SDATA 16 bus is used to transmit additional optional message data as required by the various IPC message types.

The System Bus IPC operations can be divided into three general categories. One category enables an IOP to initiate IPC operations through an SBI by asserting a predefined code on the IO BUS 42. The format of the IPC as generated by the SBI 34 on the SB 12 is shown in FIG. 3b.

The state of the command field format defines the following types of operations.

COMMAND

Class 1 IO Interrupt
Class 2 IO
Inter-Processor Communication
Synchronize Clock

Another SB 12 IPC category enables a CPU to send a message to SBI 34 (and hence a specific IOP) using the format shown in FIG. 3c.

The state of the command field defines the following types of operations.

COMMAND

Data Transfer to IOP, Data Word
Data Transfer to IOP, Data Double Word
Clear I/O Interrupt (IPCR)
Message transfer to IOP, Message-Control
Message transfer to IOP, Message-Word(IPCR)
Reset target IOP
Reset target SBI A third SB 12 IPC category enables the Support Control Unit 60 to initiate IPC's. The SCU 60 transmits an IPC message to a CPU using the format shown in FIG. 3d.

The command field format defines the following types of operation.

COMMAND

Class 1 IO Interrupt
Class 2 IO Interrupt
Inter-Processor Communication
Synchronize Clock The SCU 60 may transmit an IPC message to the SBI 34 (and hence to an IOP) using the format shown in FIG. 3e. The command field format defines commands similar to that described above in relation to FIG. 3c.

ERROR DETECTION

There are four types of error detection mechanisms supported by the SB 12.

Data Parity Error Detection

There are eight Data Parity Bits on the 64 bit Data Bus (one parity bit for each byte).

Address Parity Error Detection

There is one Address Parity Bit on the 28 bit Address Bus.

Missing Acknowledge

The Acknowledge control line is used to acknowledge Write and IPC transactions. Read operations are acknowledged by the MCU Data Return Command-ID cycle on the bus.

Sequence Error

Illegal bus control sequences are detected by the bus connections involved in a particular bus transaction.

Bus connections detecting any of the above errors assert the Bus Error line for one system bus clock cycle only. This notifies the SCU 60 of the error. The SCU thereafter redrives the Bus Error signal until the SCU 60 clears the error condition. The bus connection also stores the type of error (errors) in an SCU 60 accessible error register.

The invention described above may be embodied in yet other specific forms without departing from the spirit or essential characteristics thereof. Thus, the present embodiment is to be considered in all respects as illustrative and not restrictive, the scope of the invention being indicated by the appended claims rather than by the foregoing descriptions, and all changes which come within the meaning and range of equivalency of the claims are therefore intended to be embraced therein.

What is claimed is:

1. An information processing system comprising a system bus and a plurality of bus connections coupled to the system bus, each of the bus connections including means coupled to signal lines of the system bus for transmitting information to and for receiving information from the signal lines, at least one of the bus connections comprising means for storing information units at storage locations defined by addresses and at least one of the bus connections comprising means for providing an address for reading information units from or for storing information units within a storage location defined by the provided address, the system bus comprising:

a first plurality of dual-purpose signal lines for expressing, during a first interval of time, an information unit expressive of an identification of a bus connection and an information unit expressive of a type of access to be made to a storage means by the identified bus connection, the first plurality of dual-purpose signal lines further being expressive of, during a second interval of time, the information unit read from a storage location or an information unit to be stored within a storage location; and a second plurality of signal lines for expressing, during the first interval of time, an address within the storage means associated with the storage location from which an information unit is to be read or within which an information unit is to be stored.

2. A system bus as defined in claim 1 wherein the system bus further comprises at least one signal line the state of which is expressive of whether the first plurality of dual-purpose signal lines are expressive of an information unit associated with the first interval of time or an information unit associated with the second interval of time.

3. A system bus as defined in claim 1 wherein, for a bus connection reading an information unit from the storage means, the information unit is returned to the bus connection a variable number of time intervals after the first interval of time.

4. A system bus as defined in claim 1 wherein the storage means returns the information unit on the first plurality of dual-purpose signal lines during an interval of time immediately preceded by an interval of time wherein the storage means expresses on the first plurality of dual-purpose signal lines at least the identification of the bus connection which requested that the information unit be read and also expresses on the second plurality of signal lines, during the immediately preceding interval of time, the address associated with the information unit being returned.

5. A system bus as defined in claim 4 wherein each of the intervals of time is defined by a system clock period.

6. A system bus as defined in claim 5 wherein the system clock period is approximately 40 nanoseconds.

7. A system bus as defined in claim 4 wherein the first plurality of signal lines comprises 64 signal lines and wherein an information unit returned on the 64 signal lines represents a double word of data.

8. A system bus as defined in claim 1 wherein the storage means returns on the first plurality of dual-purpose signal lines, during a plurality of consecutive time intervals, a plurality of information units in response to a read command, each of the information units being preceded, during an immediately preceding interval of time, by an address associated with each of the plurality of information units, the address being expressed on the second plurality of signal lines.

9. An information processing system comprising a system bus and a plurality of bus connections coupled to the system bus, each of the bus connections including means coupled to signal lines of the system bus for transmitting information to and for receiving information from the signal lines, at least one of the bus connections comprising memory means for storing information units at storage locations defined by addresses, at least one of the bus connections comprising means for generating an address for reading information units from or for storing information units within a storage location defined by the generated address, the information processing system further comprising at least one system clock, the system clock having a period that defines a bus cycle, the system bus comprising:

a plurality of dual function signal lines for expressing, during a first bus cycle, an information unit expressive of an identification of a bus connection and an information unit expressive of a type of access to be made to a memory means by the identified bus connection, the dual function signal lines further being expressive of, during a second bus cycle, an information unit read from a storage location or an information unit to be stored within a storage location;

a plurality of address signal lines for expressing, during the first bus cycle, an address within the memory means associated with the storage location from which an information unit is to be read or within which an information unit is to be stored; and at least one signal line a state of which is expressive of whether the dual function signal lines are expressive of an information unit associated with the first bus cycle or an information unit associated with the second bus cycle.

10. A system bus as defined in claim 9 wherein, for a bus connection reading an information unit from the memory means, the information unit is returned to the bus connection, on the plurality of dual function signal lines, a variable number of bus cycles after the first bus cycle.

11. A system bus as defined in claim 10 wherein the memory means returns the information unit on the plurality of dual function signal lines during a bus cycle immediately preceded by a bus cycle wherein the memory means expresses on the plurality of dual function signal lines at least the identification of the bus connection which requested that the information unit be read and also expresses on the plurality of address lines, during the immediately preceding bus cycle, the address associated with the information unit being returned.

12. A system bus as defined in claim 9 wherein the memory means returns, during a plurality of consecutive bus cycles, a plurality of information units in response to a multi-information unit read command, each of the information units being preceded, during an immediately preceding bus cycle, by an address associated with each of the information units, the address being expressed on the plurality of address signal lines and each of the plurality of returned information units being expressed on the plurality of dual function signal lines.

13. A system bus as defined in claim 9 wherein the duration of a bus cycle is approximately 40 nanoseconds.

14. A method of transferring information units over an information processing system bus, the information processing system bus having a plurality of bus connections coupled thereto, each of the bus connections including means coupled to signal lines of the information processing system bus for transmitting information to and for receiving information from the signal lines, the information units being transferred at least between a memory means and a bus connection operable for transmitting information units to or receiving information units from the memory means, the method comprising the steps of:

providing a repetitive clock signal for defining bus cycles;

for a bus connection transmitting at least one information unit to the memory means driving, during a first bus cycle, a first plurality of signal lines for expressing on the first plurality of signal lines an identification of the bus connection and a command to the memory means to store at least one information unit;

driving, during the first bus cycle, a second plurality of signal lines for expressing on the second plurality of signal lines an address within the memory means wherein the at least one information unit is to be stored; and driving, during an immediately subsequent bus cycle, the first plurality of signal lines for expressing on the first plurality of signal lines an information unit to be stored; and for a bus connection receiving at least one information unit from the memory means driving, during a first bus cycle, the first plurality of signal lines for expressing on the first plurality of signal lines an identification of the bus connection and a command to the memory means to read at least one stored information unit;

driving, during the first bus cycle, the second plurality of signal lines for expressing on the second plurality of signal lines an address within the memory means wherein the at least one information unit to be read is stored;

receiving during a subsequent bus cycle, from the first plurality of signal lines, the identification of the bus connection and a command which indicates that at least one information unit is being returned from the memory means;

receiving during the subsequent bus cycle, from the second plurality of signal lines, the address from which the at least one information unit was read; and receiving during a bus cycle which immediately follows the subsequent bus cycle, from the first plurality of signal lines, the information unit.

15. A method as set forth in claim 14 wherein the command to the memory means to read at least one information unit is a command to read a plurality of information units and wherein the method further comprises the steps of receiving during the bus cycle which immediately follows the subsequent bus cycle, from the second plurality of signal lines, the address from which another information unit was read; and receiving during an immediately subsequent bus cycle, from the first plurality of signal lines, another information unit.

16. An information processing system comprising a system bus and a plurality of bus connections coupled to the system bus, each of the bus connections including means coupled to signal lines of the system bus for transmitting information to and for receiving information from the signal lines, at least one of the bus connections comprising memory means for storing information units at storage locations defined by addresses, at least one of the bus connections comprising means for generating an address for reading information units from or for storing information units within a storage location defined by the generated address, the information processing system further comprising at least one system clock, the system clock having a period which defines a bus cycle, the system bus comprising:

for a first type of bus transaction a first plurality of signal lines for expressing, during a first bus cycle, an information unit expressive of an identification of a bus connection and an information unit expressive of a type of access to be made to a memory means by the identified bus connection, the first plurality of signal lines further being expressive of, during a second bus cycle, an information unit read from a storage location or an information unit to be stored within a storage location;

a second plurality of signal lines for expressing, during the first bus cycle, an address within the memory means associated with the storage location from which an information unit is to be read or within which an information unit is to be stored; and for a second type of bus transaction the first plurality of signal lines express, during a first bus cycle, an information unit expressive of an identification of another bus connection and an information unit indicating that an access is to be made to the other bus connection; and the second plurality of signal lines express, during the first bus cycle, at least an information unit expressive of a command defining the type of access to the other bus connection.

17. A system bus as defined in claim 16 wherein the other bus connection is a system bus interface means having at least one IO processor means coupled thereto through an IO bus and wherein the second plurality of signal lines, for the second type of bus transaction, are further expressive of an identification of a particular one of the IO processor means.

* * * * *